United States Patent [19]

Preus

[11] E Re. 30,438

[45] Reissued Nov. 25, 1980

[54] INFLATABLE BARRIER FOR SUBSTANCES FLOATING ON WATER

[76] Inventor: Paul Preus, Box 1002, Court House Sq., Toms River, N.J. 08753

[21] Appl. No.: 46,491

[22] Filed: Jun. 7, 1979

Related U.S. Patent Documents

Reissue of:

[64] Patent No.: 3,849,989
Issued: Nov. 26, 1974
Appl. No.: 363,954
Filed: May 25, 1973

[51] Int. Cl.[3] ..... E02B 15/04

[52] U.S. Cl. ..... 405/68

[58] Field of Search ..... 405/68, 69, 70, 71, 405/63, 66, 60; 210/242 S, 242 R, DIG. 25

[56] References Cited

U.S. PATENT DOCUMENTS

| | | | |
|---|---|---|---|
| 961,459 | 6/1910 | Ray | 9/11 R |
| 3,503,214 | 3/1970 | Desty et al. | 405/68 |
| 3,503,508 | 3/1970 | Desty et al. | 405/68 X |
| 3,537,587 | 11/1970 | Kain | 405/60 X |
| 3,548,599 | 12/1970 | Reilly | 405/70 |
| 3,563,036 | 2/1971 | Smith et al. | 405/70 |
| 3,579,994 | 5/1971 | Preus | 405/68 |
| 3,592,006 | 7/1971 | Crucet | 405/70 X |
| 3,608,316 | 9/1971 | Manuel | 405/68 |
| 3,613,377 | 10/1971 | Zaugg | 405/72 X |
| 3,645,099 | 2/1972 | Saavedra | 405/70 |
| 3,665,713 | 5/1972 | Rath | 405/66 X |
| 3,667,235 | 6/1972 | Preus et al. | 405/63 |
| 3,720,062 | 3/1973 | Mack | 405/71 |
| 3,751,925 | 8/1973 | Thurman | 405/71 |
| 3,792,589 | 2/1974 | Sayles | 405/68 |

FOREIGN PATENT DOCUMENTS

| | | | |
|---|---|---|---|
| 317928 | 11/1969 | Sweden | 61/1 F |

*Primary Examiner*—Philip C. Kannan
*Attorney, Agent, or Firm*—Harold L. Stowell

[57] ABSTRACT

A floating barrier for substances floating on water having: a series of inflatable chambers, with plural subchambers, disposed in end-to-end relation; a flexible skirt depending from the chambers; and tension members on each side of the barrier.

4 Claims, 4 Drawing Figures

INFLATABLE BARRIER FOR SUBSTANCES FLOATING ON WATER

Matter enclosed in heavy brackets [ ] appears in the original patent but forms no part of this reissue specification; matter printed in italics indicates the additions made by reissue.

BACKGROUND OF THE INVENTION

Floating barriers, known generally as oil booms, have been found to have great utility in containing and controlling oil slicks on bodies of water. The barriers usually include floatation elements having a depending liquid impervious skirt which, when deployed around or in a controlling position relative to oil floating on water, provide means to contain or prevent the oil from spreading or moving into areas protected by the barrier.

Present art barriers generally utilize a solid material as the floatation medium since gas inflatable floatation elements are susceptible to puncture and/or deflation in the environment to which the barriers are normally subjected. Such floatation is generally suitable when, the barriers are to be utilized in relatively sheltered water where low barrier free boards are acceptible. In deep or open water applications however, the barrier free board must necessarily be large to preclude slop over of water and oil under high wave and/or wind conditions. With the larger free board, the solid type of floatation is not suitable because of great amount of storage and transportation space required and the greater difficulty in manipulating the barrier during deployment, positioning and retrieval. Furthermore, because a solid floatation element will have a larger movement of inertia than an inflated floatation element of equivalent size, the solid floatation element is more resistant to movement and therefore less able to follow wave motion without slop over.

SUMMARY OF THE INVENTION

This invention provides an inflatable barrier for substances floating on water which avoids the disadvantage of the prior art by furnishing a floatation chamber which is fabricated from a tough, puncture resistent material and is provided with independent subchambers, each capable of supporting the barrier in the event of loss of pressure in the neighboring subchamber.

In a preferred embodiment, this invention provides an inflatable barrier having plural elongated inflatable chambers along the upper edge thereof; a liquid impervious flexible skirt depending from the chambers to provide a barrier below the water line of the skirt; tension members disposed on each side of the skirt surjacent the chamber and substantially coextensive therewith and a ballasting tension member disposed along the lower edge of the skirt.

These and other objects and advantages of the invention will become more apparent to those skilled in the art by reference to the following detailed description when viewed in light of the accompanying drawings:

DESCRIPTION OF A PREFERRED EMBODIMENT

Figures 1, 2, 3, 4:
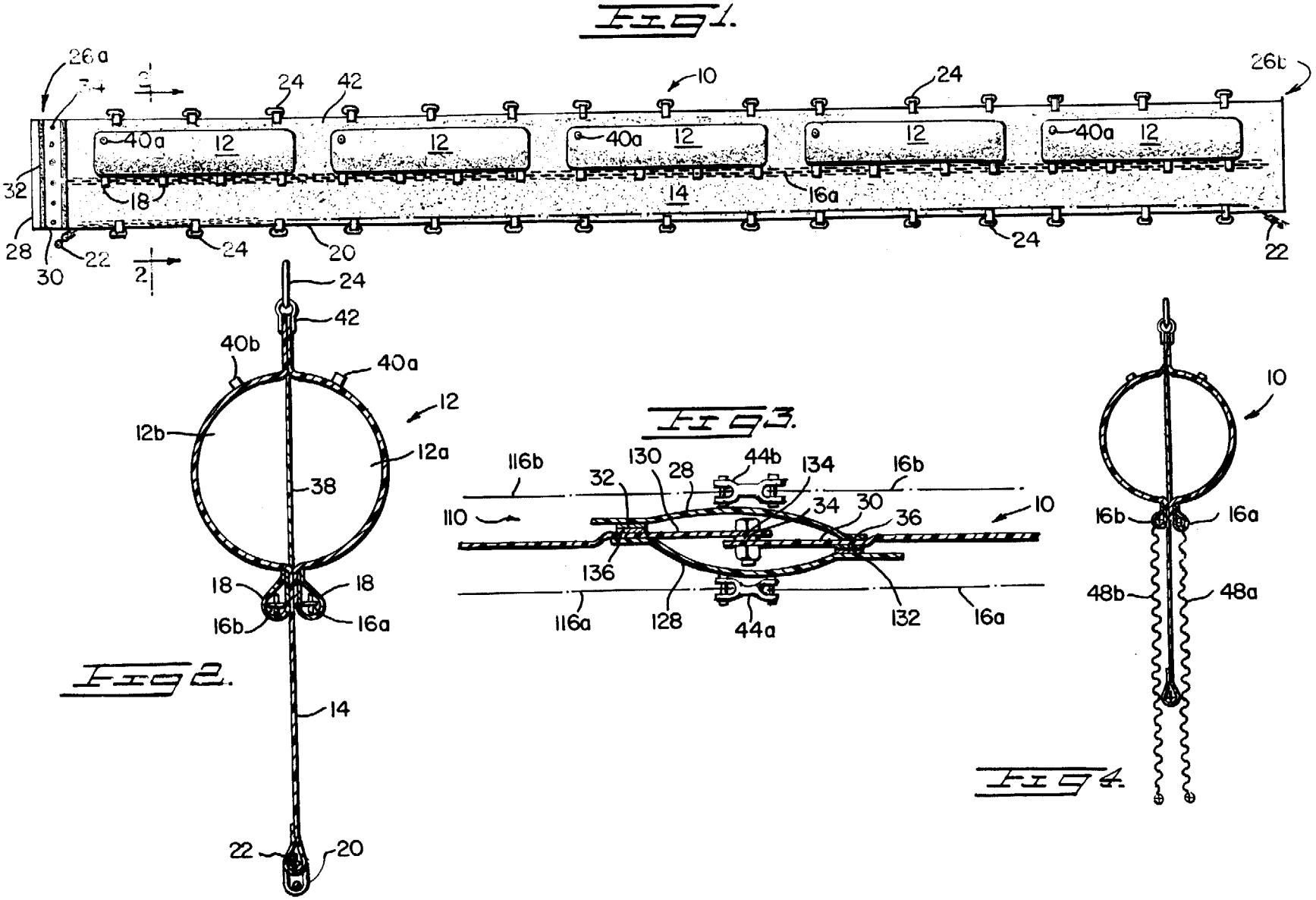
FIG. 1 is an elevational view of a device embodying features in accordance with the invention.
FIG. 2 is an enlarged sectional view of the embodiment of FIG. 1 taken along the line 2—2 thereof.
FIG. 3 is a further enlarged plan view showing the details of a joint between plural segments of the device shown in FIG. 1.
FIG. 4 is a reduced end-on view of the device of FIG. 1 illustrating another embodiment thereof.

In FIG. 1 a boom segment shown generally at 10 comprises a series of inflatable floatation chambers 12 in supporting relationship to a flexible skirt 14.

A forward tension member 16a and a rearward tension member 16b (not shown) extend substantially coextensive with the segment 10 beneath the floatation chambers 12. The tension members are maintained in place by a series of support loops 18 attached to the skirt 14 beneath the floatation chambers 12 as shown. A pocket 20 disposed along the lower edge of the skirt 14 has a tension member 22 threaded therethrough and extending substantially coextensive with the segment 10.

A plurality of hand grab loops 24 are disposed in equally spaced relationship to one another along the upper and lower edges of the segment 10. These grab loops are formed to accommodate a workman's hand and are spaced in such a manner that the next adjacent loop is within reach of the preceeding loop by a workman handling the boom. The positioning of the loops provides a means for workmen to easily hand-pass the boom either into or out of the water during deployment or retrieval of the boom. The loops along the upper edge of the segments also serve as hand grabs for workmen in boats or in the water when the boom is deployed or being manuvered and as attachment points for equipment such as flasher lights and other navigational aids. The upper and lower loops also serve as attachment points for bridles for connection to other structures such as anchors, outrigger booms or other boom systems. Connecting means generally indicated at 26a and 26b are disposed upon each end of the boom segment. These means comprise an overlapping flap 28 and a tie flap 30. The connecting means 26a and 26b are essentially mirror images of one another so that the flaps 28 and 30 the means 26b are not seen in FIG. 1. Overlapping flap 28 is provided with a vertical adhering strip 32 for closing the flap in a manner which will be described in greater detail below. Tie flap 30 is provided with a series of connectors 34 and a vertical adhering strip 36. The connectors 34 and the adhering strips 32 and 36 are disposed in such a manner that they mate with corresponding components of the end connectors of the next adjacent boom segment (not shown).

The adhering strips 32 and 36 may be of any type known in the art, however, it has been found that strips of male and female Velcro fasteners respectively are ideally suited for this purpose. The connectors 34 can again be of any type suitable for the purpose, however, common grommets formed in the tie flap 30 and machine bolts for interconnection have been found suitable for this purpose.

The boom segment 10 may be fabricated from any suitable flexible material which is compatible with the environment in which the boom is to be utilized. From the standpoint of durability and reliability, a nylon reinforced rubber compound has been found to be particularly adapted for the outside structure of the boom. With such a material the boom can be fabricated by vulcanizing the various components as is required. With other types of materials, of course, sewing, heat sealing, and/or the use of adhesive as is best suited for the particular material, could be utilized in the fabrication of the boom.

In FIG. 2, the boom is shown in section and in its inflated condition with the floatation chambers 12 in a cylindrical configuration. The chamber is divided into subchambers 12a and 12b by a flexible diaphragm 38 which is disposed to longitudinally bifurcate the chamber 12. The diaphragm 38 may be fabricated of any suitable flexible material and, in a reinforced rubber-vulcanized construction, preferably of a rubber material. The chambers 12a and 12b are provided with inflation valves 40a and 40b communicating with the interiors thereof to provide a means for inflating, maintaining inflation and deflating the subchambers. The dual chamber feature provides backup floatation in the event of puncture of any one of the subchambers. If so desired, the chamber may be further divided by additional diaphragms disposed transversely and/or longitudinally or other means to increase the number of subchambers.

The boom segment 10 is fabricated in such a manner that a fin 42 is formed along the upper surface of the floatation chamber 12. This fin functions as a spoiler to "kill" aerodynamic lift which has been found to be generated on cylindrical lightweight floatation structure due to passage of air over the cylindrical surface in certain wind conditions thereby lifting the boom out of the water and "kiting" the structure. The fin functions to trip the flow over the surface to provide non-lifting turbulent flow in a manner well known in the aerodynamic art.

In FIG. 3 the end connectors of two adjacent boom segments 10 and 110 are shown interconnected in plan view. The components of the respective boom segments are indicated by the same number only of the numerical order of the respective boom segment. As can be seen, the tie flaps 30 and 130 are interconnected by means 34 and 134 which, in the embodiment shown, are grommets and machine bolts. The overlapping flap 28 is affixed to the back of the skirt of boom segment 110 through mating adhesive strips 32 and 136 while the overlapping flap 128 of the segment 110 is affixed to the forward portion of the skirt of boom segment 10 through mating adhesive strips 36 and 132 thereby providing a fluid tight and reliable joint between the booms. The forward and rear tension members 16a and 16b, which in the embodiment shown comprise ⅜ inch galvanized chain, are interconnected to like tension members 116a and 116b of the boom segment 110 through chain connecting links 44a and 44b. A similar interconnecting link connects the tension members 22 and 122 along the lower edge of the boom segments (not shown) the latter tension members in the embodiment described are ¼ inch galvanized chain.

In FIG. 4 an end-on view the boom segment 10 is shown incorporating liquid pervious skirts 48a and 48b depending from tension members 16a and 16b respectively. These pervious skirts serve to augment the function of the boom segment 10 in high current conditions in a manner and for the purposes more fully described in U.S. Pat. No. 3,667,235 for Convertible Barrier for Substances Floating on Water.

In use, the segment 10, normally stored or maintained in a deflated condition, is deployed from its stored configuration and preferably inflated as each floatation chamber 12 is flaked out. Inflation may be either by air compressor, gas storage bottle, or by individual gas storage bottles attached or supplied for each of the valves. Inflation of the subchambers 12a and 12b is preferably sequential with the first subchamber to be inflated preferably inflated to a low pressure (i.e., on the order of 1 p.s.i.) and the second subchamber subsequently inflated to a higher pressure (i.e., on the order of 10 p.s.i.).

The boom segment may be stored either separately to be connected to one another as the boom is paid out or stored in predetermined lengths with the interconnection between segments being made before storage as the use requirements or portability needs dictate. In a preferred embodiment, each boom segment 10 is 55 feet in length therefore sections in multiples of that length may be preconnected.

The boom can be stored either in a folded condition or, due to the low deflated cross section thereof, on reels or rollers for ready deployment. Space permitting, the boom also may be stored either fully or partially inflated as use may dictate.

The tension members 16a, 16b, and 22 are essentially coextensive with the boom segment 10, however, these members with their respective connecting links are designed to present a shorter length than the length between the connectors 34 of the connecting means 26a and 26b so that loadings on the boom are absorbed and transmitted through the tension members rather than through the flexible material making up the boom segment 10.

What has been set forth above is intended as exemplary to enable those skilled in the art to practice the invention.

What is new and therefore desired to be protected by Letters Patent of the United States is:

1. A floating barrier for substances floating on water comprising:

a floatation means including plurality of inflatable chambers hingedly connected in end to end relationship, [each of said chambers being divided into plural independent subchambers by flexible wall means disposed therein] *a flexible diaphragm dividing each of the inflatable chambers into plural independent subchambers, separate inflation and deflation valve means communicating with the interiors of each of the independent subchambers,* and liquid impervious skirt means depending from said floation means to provide a liquid barrier below the water line thereof.

2. A barrier in accordance with claim 1 further comprising tension means disposed substantially coextensive with and on each side of said floatation means.

3. A barrier in accordance with claim 1 further comprising a continuous and upwardly extending member formed along the upper surface of said floatation means coextensive therewith.

4. A barrier in accordance with claim 1 further comprising plural handholds disposed at spaced intervals along the top and bottom edges of said barrier.

* * * * *